United States Patent
Wang

(10) Patent No.: US 8,755,248 B2
(45) Date of Patent: Jun. 17, 2014

(54) UNIPOLE AND BIPOLE ACOUSTIC LOGGING WHILE DRILLING TOOLS

(75) Inventor: Tsili Wang, Katy, TX (US)

(73) Assignee: Schlumberger Technology Corporation, Sugar Land, TX (US)

(*) Notice: Subject to any disclaimer, the term of this patent is extended or adjusted under 35 U.S.C. 154(b) by 1031 days.

(21) Appl. No.: 12/781,222

(22) Filed: May 17, 2010

(65) Prior Publication Data

US 2011/0280101 A1 Nov. 17, 2011

(51) Int. Cl.
*G01V 1/00* (2006.01)

(52) U.S. Cl.
USPC .............................................. 367/31; 702/14

(58) Field of Classification Search
USPC ............................. 367/38, 23, 31, 32; 702/14
See application file for complete search history.

(56) References Cited

U.S. PATENT DOCUMENTS

| | | | |
|---|---|---|---|
| 4,594,691 A | 6/1986 | Kimball et al. | |
| 4,698,792 A | 10/1987 | Kurkjian et al. | |
| 4,774,693 A | 9/1988 | Winbow et al. | |
| 4,779,236 A | 10/1988 | Sondergeld | |
| 5,278,805 A | 1/1994 | Kimball | |
| 5,639,997 A | 6/1997 | Mallett | |
| 5,780,784 A | 7/1998 | Robbins | |
| 5,852,262 A | 12/1998 | Gill et al. | |
| 5,886,303 A | 3/1999 | Rodney | |
| 5,936,913 A | 8/1999 | Gill et al. | |
| 6,470,275 B1 | 10/2002 | Dubinsky | |
| 6,614,360 B1 | 9/2003 | Leggett, III et al. | |
| 6,631,327 B2 | 10/2003 | Hsu et al. | |
| 6,661,737 B2 | 12/2003 | Wisniewski et al. | |
| 6,671,224 B1 | 12/2003 | Pabon | |
| 6,678,616 B1 | 1/2004 | Winkler et al. | |
| 6,714,480 B2 | 3/2004 | Sinha et al. | |
| 6,766,252 B2 | 7/2004 | Blanch et al. | |
| 6,772,067 B2* | 8/2004 | Blanch et al. | 702/14 |
| 6,791,899 B2* | 9/2004 | Blanch et al. | 367/38 |
| 7,035,924 B2 | 4/2006 | DeLuca et al. | |
| 2005/0078555 A1* | 4/2005 | Tang et al. | 367/31 |
| 2006/0256655 A1* | 11/2006 | Sinha et al. | 367/31 |
| 2009/0205899 A1* | 8/2009 | Geerits et al. | 181/106 |

OTHER PUBLICATIONS

X. M. Tang, et al., "Shear-Velocity Measurements in the Logging—While Drilling Environment: Modeling and Field Evaluations," Petrophysics, vol. 44, No. 2 (Mar.-Apr. 2003), pp. 79-90.

X. M. Tang, et al., "A dispersive-wave processing technique for estimating formation shear velocity from dipole and Stoneley waveforms," Petrophysics, vol. 60, No. 1 (Jan.-Feb. 1995), pp. 19-28, 9 Figs.

G. L Varsamis, et al, "LWD Shear Velocity Logging in Slow Formations Design Decisions and Case Histories," SPWLA 41st Annual Logging Symposium, Jun. 4-7, 2000, Paper O.

(Continued)

*Primary Examiner* — Mark Hellner
(74) *Attorney, Agent, or Firm* — Kenneth Liu

(57) ABSTRACT

An acoustic logging while drilling tool includes a single unipole acoustic transmitter longitudinally and azimuthally spaced apart from a single linear array of unipole acoustic receivers. In certain preferred embodiments, the linear array of unipole receivers is azimuthally spaced apart from the unipole transmitter by about either 90 or 180 degrees. A bipole logging while drilling tool includes two unipole acoustic transmitters and two linear arrays of unipole acoustic receivers.

18 Claims, 13 Drawing Sheets

(56) References Cited

OTHER PUBLICATIONS

C. H. Cheng and M. N. Toksoz, "Elastic Wave Propagation in a Fluid-Filled Borehole and Synthetic Acoustic Logs," Geophysics, vol. 46, No. 7, Jul. 1981, pp. 1042-1053.

D. P. Schmitt, "Shear Wave Logging in Elastic Formations," J. Acoust. Soc. A., 84(6), Dec. 1988, pp. 2215-2229.

M. T. Taner, F. Koehler, and R. E. Sheriff, "Complex seismic trace analysis," Geophysics, vol. 44, No. 6 (Jun. 199); pp. 1041-1063.

C. H. Cheng and M. Nfi Toksoz, "Determination of Shear Wave Velocities in "Slow" Formations," SPWLA 24th Annual Logging Symposium, Jun. 37-30, 1983, Paper V.

Georgios L. Varsamis, et al., "A New MWD Full Wave Dual Mode Sonic Tool Design and Case Histories," SPWLA 40th Annual Logging Symposium, May 30-Jun. 3, 1999, Paper P.

F. El-Wazeer, et al., "Applications for a Full Wave Sonic LWD Tool in the Middle East," Society of Petroleum Engineers 13th Middle East Oil Show & Conference, Apr. 5-8, 2003, SPE 81474.

Jennifer Market, et al., "Processing and Quality Control of LWD Dipole Sonic Measurements," SPWLA 43rd Annual Logging Symposium, Jun. 2-5, 2002, Paper PP.

Chaur-Jian Hsu and Kikash K. Sinha, "Mandrel effects on the dipole flexural mode in a borehole," J. Acoust. Soc. Am. 104(4), Oct. 1998, pp. 2025-2039.

Boonen, P., Yogeswaren, E., "A dual-frequency LWD sonic tool expands existing unipolar transmitter technology to supply shear wave data in soft formations" SPWLA 45th Annual Logging Symposium, Jun. 6-9, 2004.

Market, J. and Deady, R., "Azimuthal Sonic Measurements: New methods in theory and practice" SPWLA 49th Annual Logging Symposium, May 25-28, 2008.

Market, J., "New Broad Frequency LWD Multipole Tool Provides High Quality Compressional and Shear Data in a Wide Variety of Formations" SPWLA 48th Annual Logging Symposium, Jun. 3-6, 2007.

Kozak, M., "Phase Velocity Processing for Acoustic Logging-While-Drilling Full Waveform Data" SPWLA 42nd Annual Logging Symposium, Jun. 17-20, 2001.

\* cited by examiner

UNIPOLE AND BIPOLE ACOUSTIC LOGGING WHILE DRILLING TOOLS

RELATED APPLICATIONS

None.

FIELD OF THE INVENTION

The present invention relates generally to acoustic logging of subterranean formations. More particularly, this invention relates to an acoustic logging while drilling tool having a linear array of unipole receivers that is circumferentially spaced from a unipole transmitter.

BACKGROUND OF THE INVENTION

The use of acoustic (e.g., audible and/or ultrasonic) measurement systems in prior art downhole applications, such as logging while drilling (LWD), measurement while drilling (MWD), and wireline logging applications, is well known. Such acoustic measurement systems are utilized in a variety of downhole applications including, for example, borehole caliper measurements, measurement of drilling fluid properties, and the determination of various physical properties of a formation. In one application, acoustic waveforms may be generated at one or more transmitters deployed in the borehole. The acoustic responses may then be received at an array of longitudinally spaced apart receivers deployed in the borehole. Acoustic logging in this manner provides an important set of borehole data and is commonly used in both LWD and wireline applications to determine compressional and shear wave velocities (also referred to as slowness) of a formation.

It will be appreciated that the terms slowness and velocity are often used interchangeably in the art. They will likewise be used interchangeably herein with the understanding that they are inversely related to one another and that the measurement of either may be converted to the other by simple and known mathematical calculations. Additionally, as used in the art, there is not always a clear distinction between the terms LWD and MWD. Generally speaking MWD typically refers to measurements taken for the purpose of drilling the well (e.g., navigation) whereas LWD typically refers to measurements taken for the purpose of analysis of the formation and surrounding borehole conditions. Nevertheless, these terms are herein used synonymously and interchangeably.

In the analysis of acoustic logging measurements, the received acoustic waveforms are typically coherence processed to obtain a time-slowness plot. In a time-slowness plot, also referred to as a slowness-time-coherence (STC) plot or a semblance plot, a set of several signals from the array of acoustic receivers is processed with the incorporation of separate time shifts for each received signal. The separate time shifts are based on a slowness value assumed for the purpose of processing the waveforms. The processing provides a result, known as coherence, which can signify the presence of a discernable signal received by the separate receivers. In this manner compressional and shear wave arrivals can be discerned in the received waveforms, leading to determinations of their velocities. The determined compressional and shear wave velocities are related to compressive and shear strengths of the surrounding formation, and thus provide useful information about the formation.

In acoustically slow formations, in which the velocity of formation shear waves is less than the speed of sound in the drilling fluid (mud), shear wave slowness determination is known to be complicated by poor transmission of shear wave energy across the boundary between the formation and the borehole. Various techniques have been developed for determining shear wave slowness in acoustically slow formations. These techniques commonly involve exciting relatively pure mode borehole guided waves (e.g., monopole, dipole, or quadrupole mode waves). The shear wave slowness is then estimated from the guided wave velocity of these pure modes.

Unfortunately, guided wave propagation tends to be highly dispersive in LWD applications. Although STC analysis is widely used, dispersive effects in the received waveforms can reduce the reliability of the STC analysis. By dispersive it is meant that the guided wave slowness depends on the frequency at which the wave propagates. Many factors contribute to the amount of slowness dispersion. These factors include, for example, tool body properties, eccentricity, borehole diameter, formation shear slowness and compressional slowness, and mud density and slowness. In order to obtain a suitably accurate shear slowness value, processing is required that relies upon values for these factors. This processing is commonly referred to in the art as "dispersion correction". In many applications, values for each of these other factors are not accurately known, which can in turn lead to errors in the shear slowness estimate.

Another drawback with the aforementioned techniques is that logging while drilling tools configured for transmitting and/or receiving relatively pure acoustic modes require highly complex transmitter and/or receiver configurations, which tend to be expensive. For example, transmitters configured to produce a pure acoustic mode typically include numerous (e.g., four, eight, or even more) distinct transducer elements deployed about the circumference of the tool body. In order to produce a pure mode and to suppress other modes, highly precise phasing (timing) of the various transducers is typically further required. The difficulty in generating such acoustic signals is also known to be further exacerbated by tool eccentricity in the borehole (e.g., in highly deviated wells in which the tool typically lies on the low side of the borehole). Moreover, the use of such complex transmitters and receivers in severe downhole conditions including extreme temperatures and pressures and severe mechanical shocks and vibrations tends to reduce tool reliability.

Therefore, there exists a need for an improved logging while drilling tool. In particular, there is a need for an improved logging while drilling tool suitable for determining shear wave slowness in acoustically slow formations.

SUMMARY OF THE INVENTION

The present invention addresses one or more of the above-described drawbacks in currently available logging while drilling tools for making acoustic logging measurements of a subterranean formation. In one exemplary embodiment, the invention includes an acoustic logging while drilling tool having a single unipole transmitter longitudinally and azimuthally spaced apart from a single linear array of unipole receivers. In certain preferred embodiments, the linear array of unipole receivers is azimuthally spaced apart from the unipole transmitter by about 180 degrees. In another preferred embodiments, the linear array of unipole receivers is azimuthally spaced apart from the transmitter by about 90 degrees. In another preferred embodiment, the invention includes a single bipole transmitter and a single bipole array of unipole receivers azimuthally spaced apart by about 90 degrees.

Exemplary embodiments of the present invention provide several technical advantages. For example, azimuthal spacing of the linear array of unipole receivers from the unipole transmitter tends to advantageously reduce dispersion correction when the received waveforms are processed to obtain shear wave slowness. Moreover, the use of an azimuthally spaced array enables the reduction in dispersion correction to be achieved with minimal additional fabrication costs over those of a conventional unipole acoustic logging tool.

Embodiments in which the unipole transmitter and the linear array are azimuthally spaced by about 180 degrees may further be suitable for making acoustic anisotropy measurements in that these embodiments tend to reduce the undesired azimuthal sensitivity to tool eccentricity. Embodiments in which the unipole transmitter and the linear array are azimuthally spaced by about 90 degrees may further be suitable for making acoustic measurements with reduced tool mode contamination.

In one aspect the present invention includes an acoustic logging while drilling tool. A single unipole acoustic transmitter is deployed on a logging while drilling tool body. The transmitter is configured to transmit an acoustic waveform having a first frequency into a subterranean borehole. A single linear array of unipole acoustic receivers is also deployed on the tool body. The linear array includes a plurality of longitudinally spaced apart unipole acoustic receivers configured to receive the transmitted acoustic waveform. The acoustic receivers are longitudinally and azimuthally spaced apart from the unipole acoustic transmitter. In preferred embodiments, the unipole acoustic receivers are azimuthally spaced apart from the unipole acoustic transmitters by an angle of about 90 degrees or about 180 degrees.

In another aspect, the present invention includes an acoustic logging while drilling tool. Two unipole acoustic transmitters are deployed on a logging while drilling tool body. The unipole acoustic transmitters are azimuthally spaced apart from one another by about 90 degrees with each unipole acoustic transmitter being configured to transmit an acoustic waveform into a subterranean borehole. Two linear arrays of unipole acoustic receivers are also deployed on the tool body. The linear arrays are azimuthally spaced apart from one another by an angle of about 90 degrees. The unipole acoustic receivers are configured to receive the transmitted acoustic waveforms. The linear arrays are further longitudinally and azimuthally spaced apart from at least one of the unipole acoustic transmitters.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
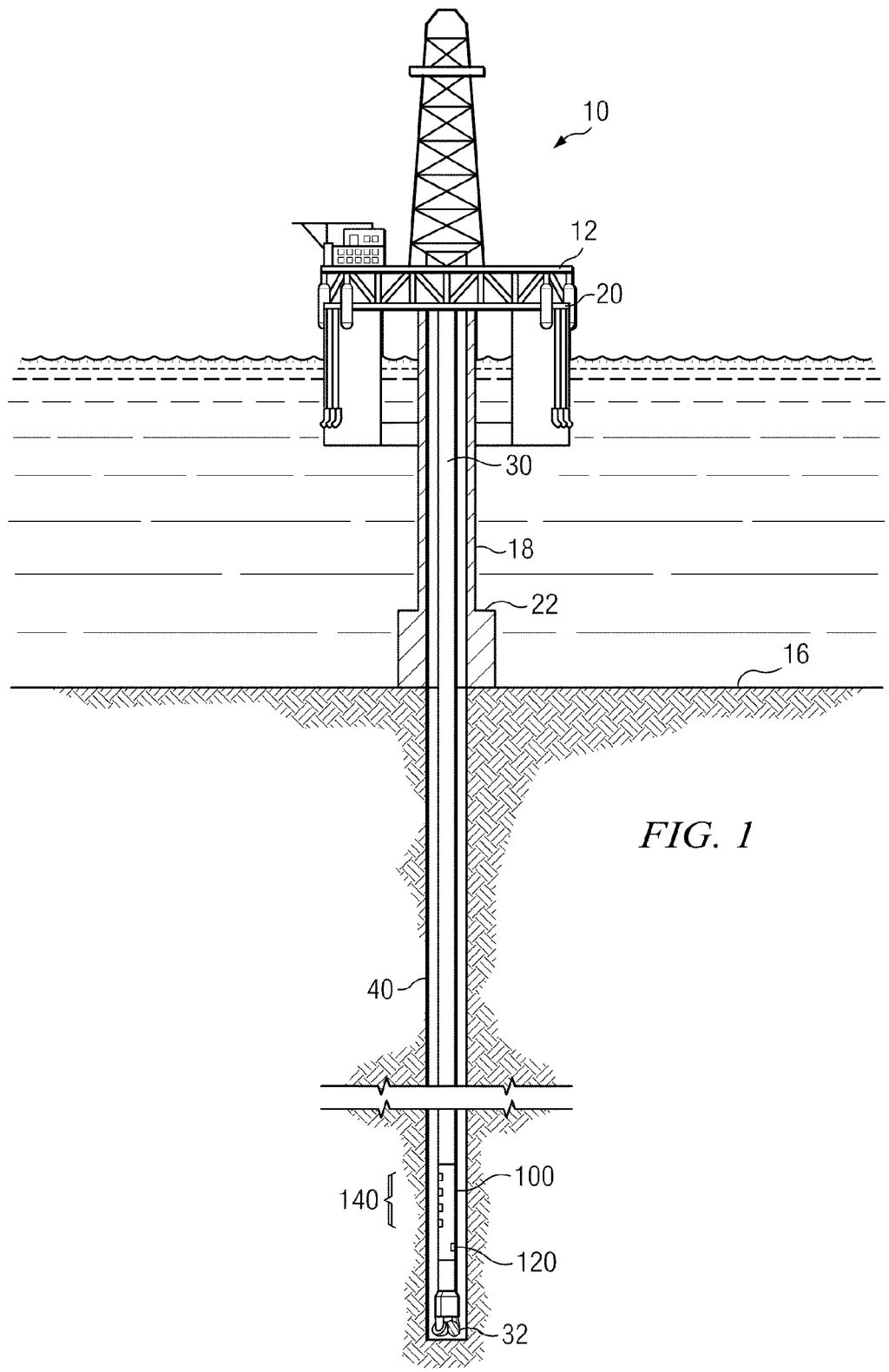
FIG. 1 depicts one exemplary embodiment of an acoustic logging tool according to the present invention in use in an offshore oil or gas drilling assembly.

FIG. 1 depicts one exemplary embodiment of an acoustic logging while drilling (LWD) tool 100 according to this invention in use in an offshore oil or gas drilling assembly, generally denoted 10. In FIG. 1, a semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering the drill string 30, which, as shown, extends into borehole 40 and includes a drill bit 32 and an acoustic logging tool 100. In the embodiment shown, and described in more detail below with respect to FIG. 6, LWD tool 100 includes at least one unipole transmitter 120 and at least one linear array 140 of longitudinally spaced unipole receivers. The linear array of receivers 140 is both longitudinally and azimuthally spaced apart from the unipole transmitter 120. Drill string 30 on FIG. 1 may further include a downhole drill motor, a mud pulse telemetry system, and one or more other sensors, such as a nuclear logging instrument and/or an acoustic caliper tool, for sensing downhole characteristics of the borehole and the surrounding formation. The invention is not limited in these regards.

It will be understood by those of ordinary skill in the art that the acoustic logging tool 100 of the present invention is not limited to use with a semisubmersible platform as illustrated in FIG. 1. Acoustic logging tool 100 is equally well suited for use with any kind of subterranean drilling operation, either offshore or onshore. Before describing acoustic logging tool 100 in more detail in connection with FIG. 6, features of a prior art tool are discussed.

Figure 2:
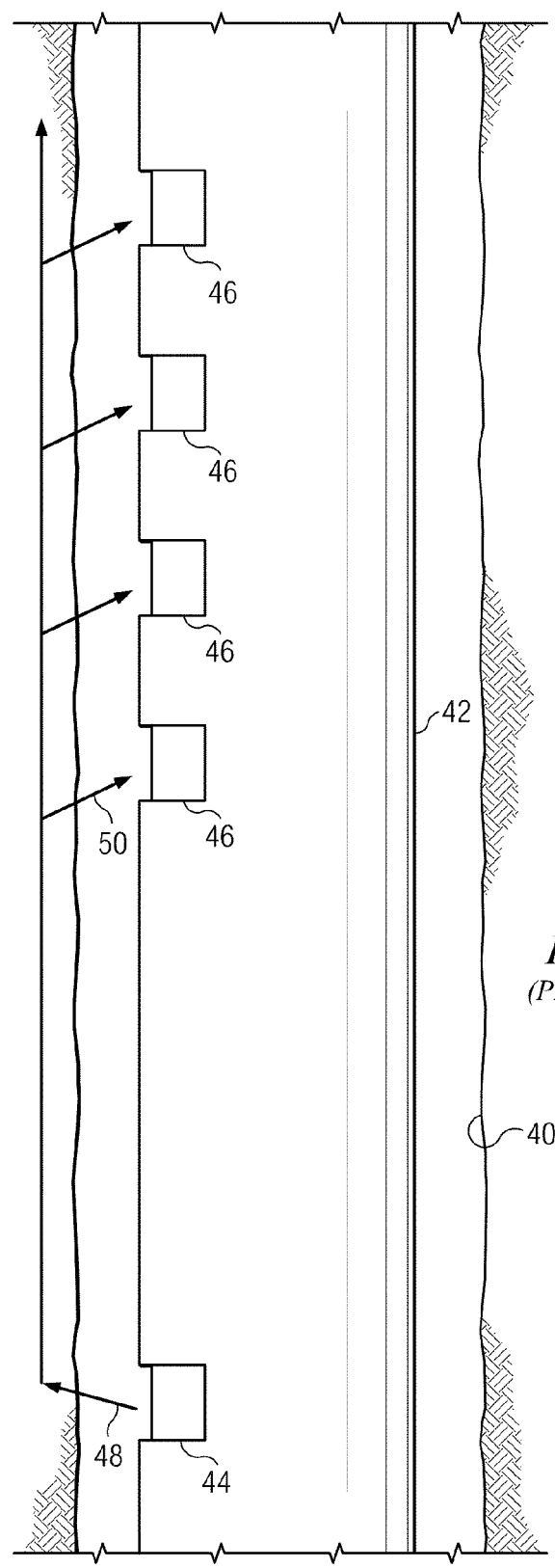
FIG. 2 depicts a cross sectional view of a portion of a prior art acoustic logging while drilling tool deployed in a borehole.

FIG. 2 depicts a cross sectional view of a portion of a prior art acoustic logging while drilling tool 42 deployed in a borehole 40. Logging tool 42 is similar to that disclosed in commonly assigned U.S. Pat. No. 7,039,524 to Haugland (the Haugland patent) and includes a unipole transmitter 44 longitudinally offset from a linear array of longitudinally spaced apart unipole acoustic receivers 46. The transmitter 44 and receivers 46 are circumferentially aligned, i.e., they are deployed at the same azimuthal position on the tool body. As also shown, the receivers 46 are equally (or uniformly) spaced, e.g., at a spacing between about 6 and 12 inches.

It will be understood that as used herein the term "unipole transmitter" refers to a transmitter (a source) including exactly one transducer located at a single azimuthal position on the tool body. The unipole transmitter therefore tends to propagate a directional pressure pulse. Similarly, the term "unipole receiver" will be understood to refer to a receiver including exactly one transducer located at a single azimuthal position on the tool body. The unipole receiver tends to have a directional sensitivity to an incoming acoustic wave, complementary to the directionality of the single transducer used in a unipole transmitter. It should be noted that unipole transmitters and receivers (as the terms are used herein) are distinct from monopole transmitters and receivers. A conventional monopole transmitter, for example, includes multiple circumferentially spaced transducers (e.g., 4, 8, or even more) deployed about the tool body. These multiple transducers are configured to fire simultaneously so as to produce a pressure pulse that radiates omni-directionally away from the monopole transmitter. Unipole transmitters and receivers are also distinct from dipole and quadrupole transmitters and receivers, which also typically utilize multiple circumferentially spaced transducers deployed about the tool body. These pure (or pseudo pure) mode transmitters and receivers typically further include complex circuitry configured, for example, to ordain the relative timing of the various transducers (e.g., the timing of firing in a transmitter). No such circuitry is required in a unipole transmitter.

Moreover, it will be further understood that a logging tool having a "single unipole transmitter" refers to a tool including exactly one unipole transmitter configured to transmit acoustic waves at any one particular frequency. It will be understood, for example, that a logging tool having a "single unipole transmitter" may include a second transmitter configured to transmit acoustic waves at a distinct (different) second frequency. A logging tool having a "single linear array of unipole receivers" refers to a tool including exactly one linear array of unipole receivers. A "linear array of unipole receivers" refers to a plurality of longitudinally spaced unipole receivers deployed at a single azimuthal (circumferential) position on the tool body.

With reference again to FIG. 2, those of ordinary skill in the art will appreciate that a unipole transmitter 44 transmits acoustic energy into the borehole as depicted at 48 during acoustic logging operations. A portion of the transmitted energy may enter the formation and induce compressional and/or shear waves therein. These waves propagate through the formation and may be received at the unipole receivers 46 as depicted at 50. As is known in the art, the received compressional and shear waves may be utilized to compute compressional and shear wave velocities of the formation (e.g., via conventional time-of-flight calculations). The compressional and shear wave velocities are known to be related to compressive and shear strengths of the surrounding formation, and thus provide useful information about the formation.

As described above in the Background Section, determination of shear slowness in acoustically slow formations can be difficult owing to the lack of shear waves refracted back into the borehole fluid. Shear waves propagating in the formation leak energy into the borehole fluid as evanescent waves (also referred to as leaky shear waves) which decay exponentially with distance from the borehole wall. These evanescent waves are usually not detectable by a logging tool. Certain prior art methods intended to overcome this problem commonly involve measuring the slowness of a relatively pure mode borehole guided wave, such as Stoneley waves (excited by monopole sources), flexural waves (excited by dipole sources), and screw waves (excited by quadrupole sources). In LWD applications, the trend in the art is clearly towards the use of broadband quadrupole waveforms (see, for example, Tang, et al., in *Petrophysics*, vol. 44, pgs. 79-90, 2003). As described above, generating and receiving pure mode guided waves (e.g., screw waves) requires complex transmitter and receiver assemblies, which in turn increases tool expense and tends to reduce reliability.

A unipole tool (e.g., tool 42 in FIG. 2) makes use of a mixture of Stoneley, flexural, and screw waves (which are also referred to in the art as monopole, dipole, and quadrupole waves). The Haugland patent teaches a method in which mixed mode signals (referred to in the Haugland patent as multi-pole) may be utilized to determine a shear slowness without isolating, suppressing, or enhancing any particular waveform modes in either transmission or reception of the acoustic energy. The waveforms may be taken as they are received. For example, activities such as filtering, interference, or adding or subtracting of various waveforms from one transducer with that of another, are not required. Likewise, it is not necessary to deploy transmitters or receivers having a particular geometry, or to ordain the timing of various components to transmit or receive substantially pure or pseudo pure monopole, dipole, or quadrupole waveforms. As such, the Haugland patent purports to obviate the need for the complex transmitters and receivers of the prior art.

Figure 3:
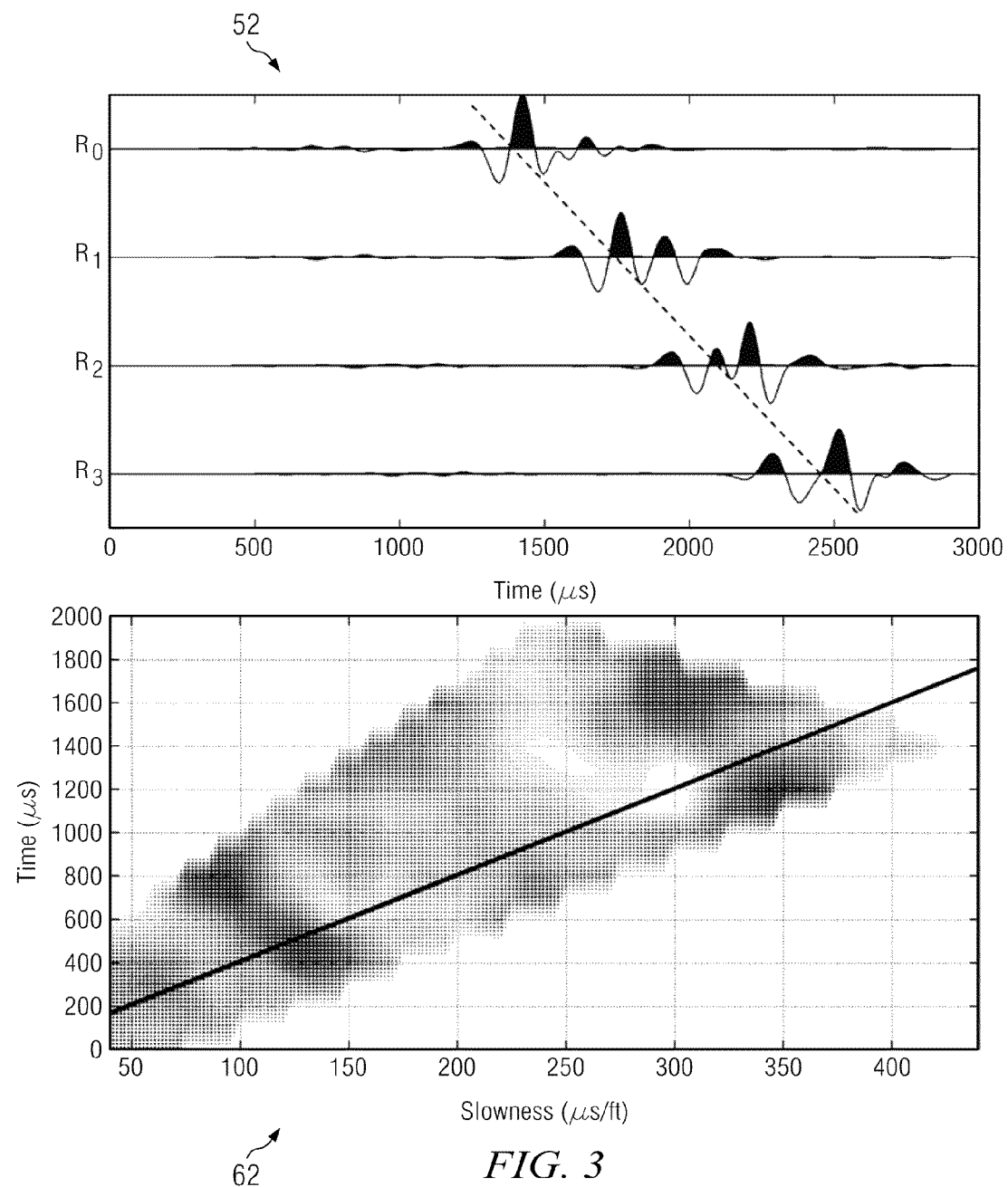
FIG. 3 depicts a semblance plot for a model tool similar to the prior art tool depicted in FIG. 2.

While conventional unipole tools tend to provide the above described significant advantages, these conventional unipole tools can also be susceptible to dispersion. This is now described in more detail with respect to FIG. 3, which depicts a theoretical coherence plot. In this example, an LWD tool 42 having a seven inch diameter is deployed in a borehole having a 9.5 inch diameter. The formation has a theoretical compressional slowness of 110 μs/ft and a theoretical shear slowness of 270 μs/ft. The drilling fluid has a slowness of 203 us/ft. The upper plots 52 in FIG. 3 depict acoustic waveforms received at four consecutive receivers $R_0$, $R_1$, $R_2$, and $R_3$ which are spaced 12 inches apart in this example. The waveforms received at the receivers $R_1$, $R_2$, and $R_3$ show increasing dissimilarities to the waveform received at the receiver $R_0$ nearest to the transmitter. This is the result of dispersive acoustic wave propagation. In the presence of such dispersion, more sophisticated waveform processing is needed, since the results of conventional STC processing can give inaccurate results. The effect of the dispersion on STC processing can be clearly seen on grayscale semblance plot 62. In the modeled data, the shear slowness determined via semblance analysis is about 350 μs/ft, which is about 30% greater than the theoretical shear slowness used as an input (270 μs/ft).

One aspect of the present invention is the realization that the previous theoretical understanding of a unipole tool tends to be deficient. In particular, it was previously assumed that a unipole tool is approximately equivalent to a monopole tool combined with a dipole tool (see Kozak et al, *SPWLA 42$^{nd}$ Annual Logging Symposium*, 2001), however a detailed theoretical understanding was lacking. While not wishing to be limited or bound by any theory, this disclosure puts forth a new unipole theory that has contributed to the development of improved unipole sonic logging tools in accordance with the present invention. Features of that theory are discussed below with respect to FIG. 4 prior to disclosing exemplary embodiments in accordance with the invention.

Figure 4:
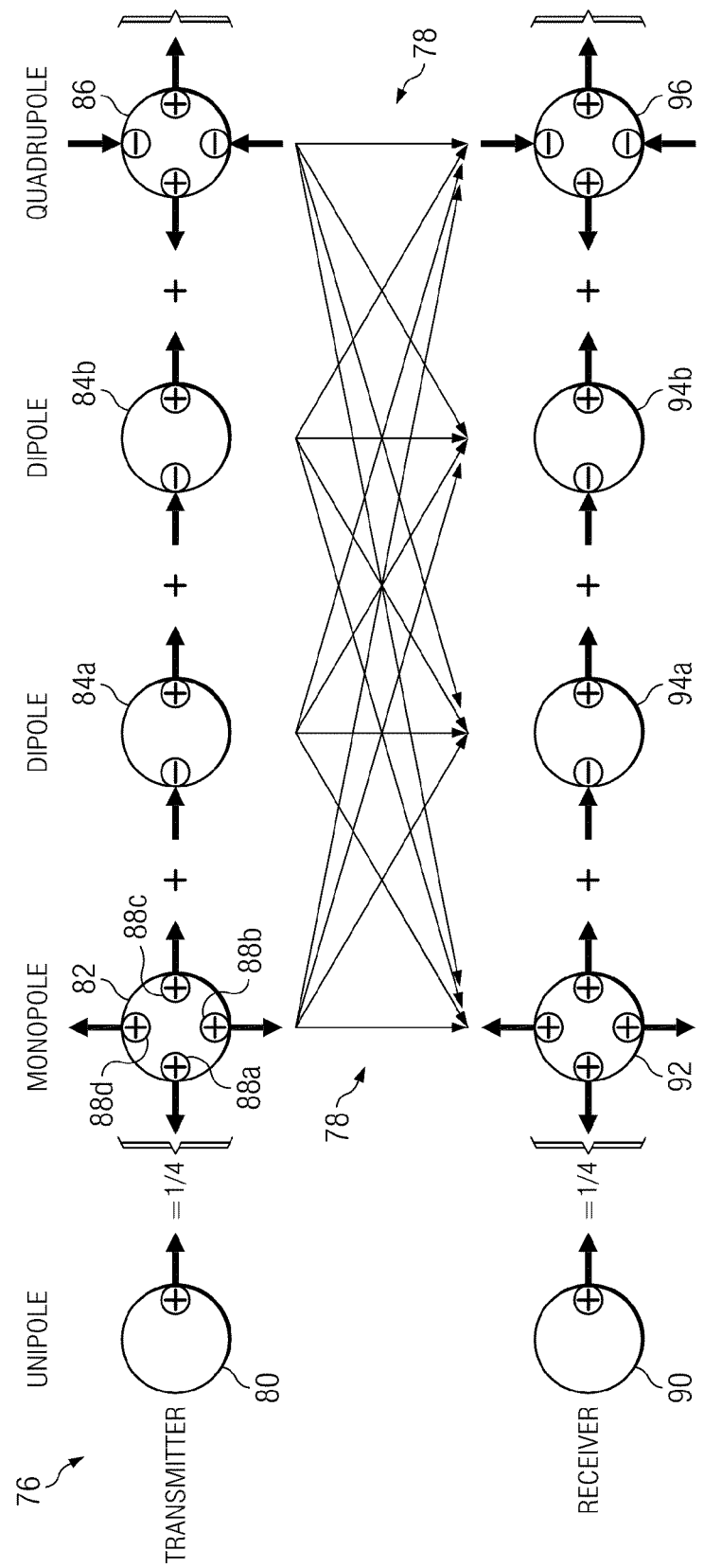
FIG. 4 depicts decomposition of a conventional unipole transmitter as a weighted sum of monopole, dipole, and quadrupole mode transmitters.

FIG. 4 schematically depicts decomposition of a unipole transmitter 80 as a weighted sum of monopole 82, dipole 84a and 84b, and quadrupole 86 transmitters. Each of the larger circles in FIG. 4 represents a circular cross section of the downhole tool body. The smaller circles (e.g., circles 88a, 88b, 88c, and 88d in monopole transmitter 82) indicate transducer positions on the tool body. Similar conventions are employed in depicting the decomposition of a unipole receiver 90 as a sum of monopole 92, dipole 94a and 94b, and quadrupole 96 receivers. It will be appreciated that the unipole transmitter-receiver system shown includes a circumferentially aligned transmitter 80 and receiver 90, and thus schematically depicts the prior art tool 42 shown in FIG. 2.

The plus (+) and minus (−) signs in each of the transducer symbols (small circles) in FIG. 4 designate the relative polarity of the acoustic waves associated with that transducer, either emitted or received. The vertical and diagonal arrowed lines, directed from the decomposed transducers 82, 84a, 84b, and 86 in the unipole transmitter 80 to the decomposed transducers 92, 94a, 94b, and 96 in the unipole receiver 90 depict couplings 78 between the various acoustic modes (monopole, dipole, and quadrupole). Taking these couplings into consideration is one aspect of the new theory and enables an analysis of the unipole transmitter-receiver system response.

The relation between a unipole tool and monopole, dipole, and/or quadrupole sources can be analyzed in accordance with the decomposition of a unipole transducer into the several components shown in FIG. 4. In the decomposition shown on FIG. 4, as well as in the decompositions described in more detail below with respect to FIGS. 7 and 13, the transducers are assumed to have equal strength (for the transmitter transducers) and equal sensitivity (for the receiver transducers). It follows that a unipole transducer contains ¼ of a monopole, ½ of a dipole, and ¼ of a quadrupole. Because the prior art unipole tools, such as the tool 42 shown in FIG. 2, employ unipole transmitters and unipole receivers for both transmitters and receivers, to a good approximation the unipole tool response can be synthesized from a full combination of the monopole, dipole, and quadrupole responses, as suggested by FIG. 4. More specifically, the unipole tool response may be represented mathematically, for example, as follows:

$$Uu=(Mm+2Md+Mq)+(2Dm+4Dd+2Dq)+(Qm+2Qd+Qq) \quad \text{Equation 1}$$

where the first (uppercase) letter represents the transmitter mode and the second (lowercase) letter represents the receiver mode. For example, Uu stands for a unipole response, that is, the response of a unipole receiver to radiation emitted by a unipole transmitter. Similarly, Dd denotes a model dipole response, that is, the response of a dipole receiver to radiation emitted by a dipole transmitter. The bold terms in Equation 1 are the direct modes, while the others are cross modes. In Equation 1, a convention as to the direction associated with the dipole component of the transducers is implied. This convention leads to the plus signs in Equation 1 for the cross modes involving the dipole transmitter component (Dm and Dq) and those involving the dipole receiver component (Md and Qd).

In an axially symmetric formation (e.g., a centered tool in an isotropic formation), the cross modes (Md, Dq, etc.) can be eliminated to this level of approximation. In such conditions, Equation 1 reduces to:

$$Uu=Mm+4Dd+Qq \quad \text{Equation 2}$$

Equation 2 indicates that a conventional unipole tool response is composed of ⅙ of a monopole response, ⅔ of a dipole response, and ⅙ of a quadrupole response. This analysis suggests that a conventional unipole tool, such as tool 42 depicted on FIG. 2, is dominated by a dipole tool response.

Figure 5:
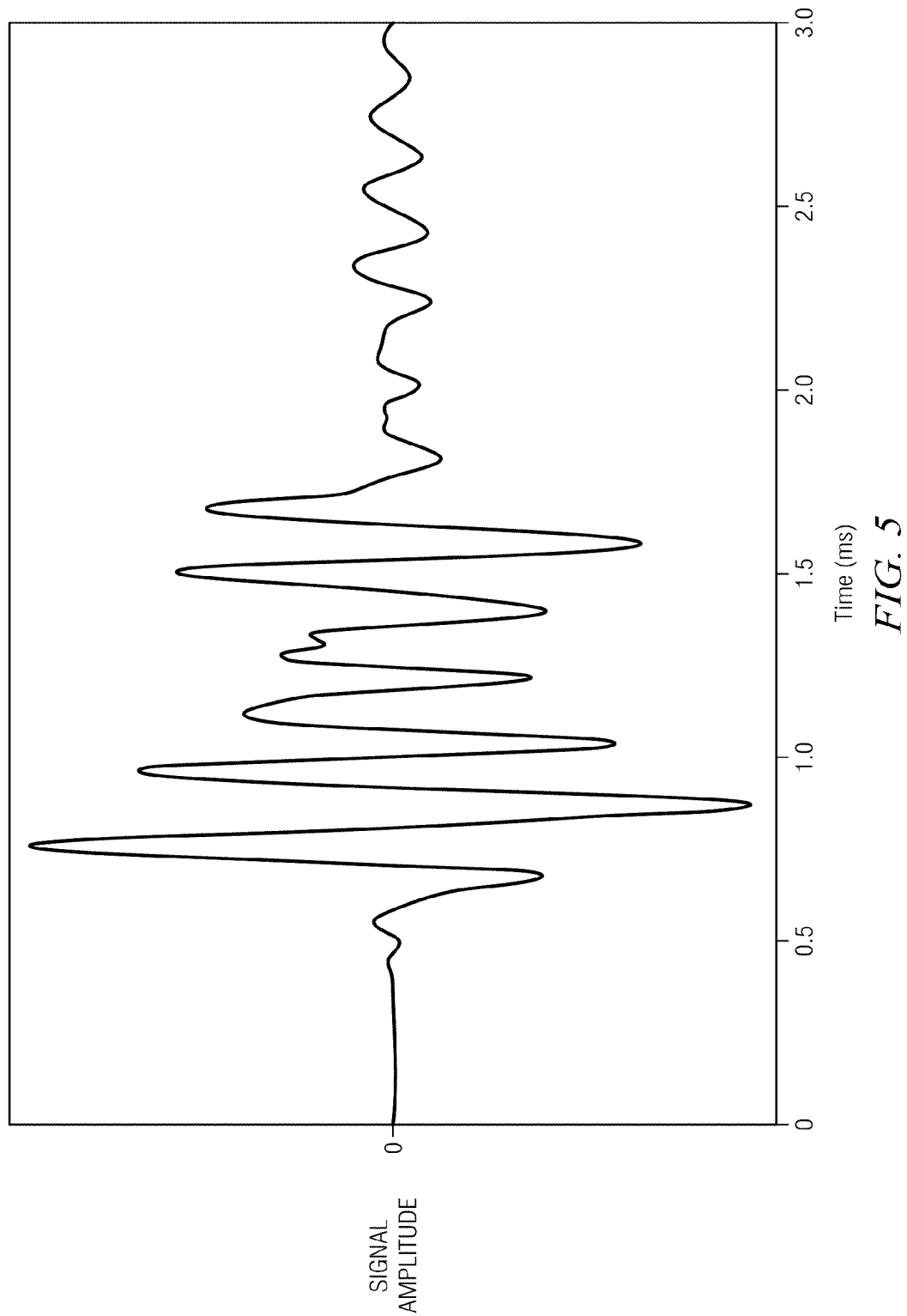
FIG. 5 depicts a plot comparing the response of a model unipole tool with a unipole response synthesized from distinct monopole, dipole, and quadrupole responses.

Numerical simulations were performed for a model unipole tool to evaluate the unipole tool response. In addition, separate calculations were performed for the monopole, dipole, and quadrupole responses and a synthetic unipole response assembled from those results according to Equation 2. The waveforms depicted on FIG. 5 indicate that the synthesized unipole response is virtually identical to a computed unipole response, further supporting the validity of the decomposition theory discussed above with respect to FIG. 4 and Equations 1 and 2.

It has generally been accepted among those skilled in the art that a dipole acoustic tool is not a good choice for LWD sonic measurement, the dipole tool having two fundamental limitations. First, the tool mode is known to strongly interfere with the formation response in dipole tools. In particular, measurements of the dipole shear wave traveling along the borehole tend to be severely contaminated by the dipole wave energy traveling in the tool body (referred to in the art as the "tool mode"). As a result, dipole-type acoustic LWD tools are commonly considered to be less than ideal for measuring shear wave velocity of slow subsurface earth formations.

A second complication with the prior art tool 42 of FIG. 2 is that a large dispersion correction is often required in order to obtain an accurate shear slowness. The amount of dispersion correction required for conventional unipole tools often exceeds 20%. For example, a dispersion correction of 30% was required in FIG. 3. Moreover, accurate values of the mud weight, borehole caliper, tool position in the borehole, formation properties, and other borehole and formation parameters are required to perform the dispersion correction. Such information is not always readily available in LWD operations.

Figure 6:
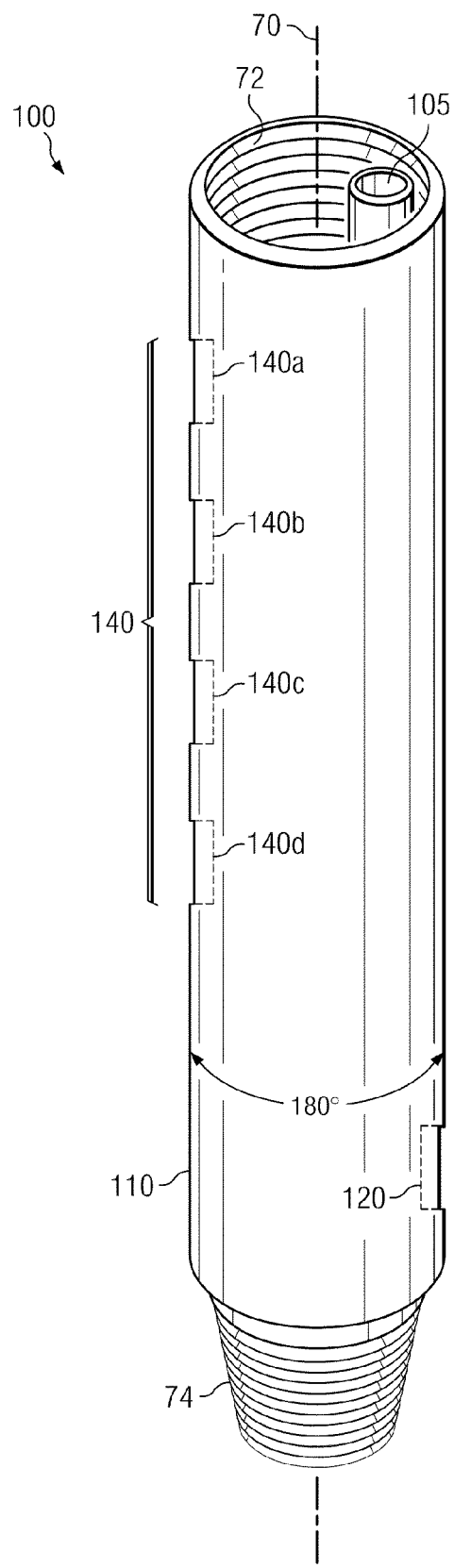
FIG. 6 depicts one exemplary embodiment of an acoustic logging tool according to the present invention in perspective view.

Turning now to FIG. 6 one exemplary embodiment of an acoustic LWD tool 100 in accordance with the present invention is depicted in perspective view. LWD tool 100 is typically a substantially cylindrical tool, being largely symmetrical about cylindrical axis 70 (also referred to herein as a longitudinal axis). LWD tool 100 includes a substantially cylindrical downhole tool body 110 configured for connecting to a drill string and therefore typically, but not necessarily, includes threaded end portions 72 and 74. Through pipe 105 provides a conduit for the flow of drilling fluid downhole, for example, to a drill bit assembly. In the exemplary embodiment depicted, LWD tool 100 includes a single unipole transmitter 120 deployed on the tool body 110 and configured to transmit an acoustic waveform into a subterranean borehole. LWD tool 100 also includes a single linear array 140 of unipole receivers 140a, 140b, 140c, and 140d (140a-140d) deployed on the tool body 110. It will be appreciated that some details of the embodiment of FIG. 6, for example, the through pipe 105 and the threaded end portions 72 and 74, while not shown are also common to the alternative embodiments discussed below in connection with FIGS. 10, 11, and 12.

In the exemplary embodiment depicted on FIG. 6, the unipole transmitter 120 is both longitudinally and circumferentially spaced apart from the linear array 140. In this particular embodiment, the linear array 140 is azimuthally spaced apart from the unipole transmitter 120 by an azimuthal angle of about 180 degrees (i.e., the transmitter and the receiver array are deployed on opposite sides of the tool). The unipole receivers 140a-140d are configured to receive a transmitted acoustic waveform to produce a set of received waveforms. The exemplary embodiment depicted on FIG. 6, in which the unipole transmitter 120 and the linear array are azimuthally spaced apart by 180 degrees is referred to herein as a cross-unipole tool. It is understood, of course, that in various other embodiments in accordance with the invention, the unipole transmitter 120 and the linear array 140 may be azimuthally spaced apart by substantially any non-zero angle. The invention is not limited to cross-unipole embodiments in which the azimuthal spacing is 180 degrees. Certain others of these embodiments are discussed in more detail below with respect to FIGS. 10 and 11.

It will be appreciated that while the embodiment shown in FIG. 6 includes a receiver array 140 having four receivers 140a-140d, the invention is not limited to any particular number of receivers. Thus, in certain embodiments the linear array 140 may include, for example, six or more unipole receivers. Moreover, in certain embodiments, the acoustic LWD tool 100 can include a plurality of unipole transmitters. For example, LWD tool 100 may include first and second longitudinally spaced unipole transmitters configured to transmit acoustic energy at corresponding first and second distinct frequencies (e.g., the first transmitter at a low frequency, e.g., 2-6 kHz, and the second transmitter at a high frequency, e.g., 10-15 kHz). The invention is not limited in these regards.

Figure 7:
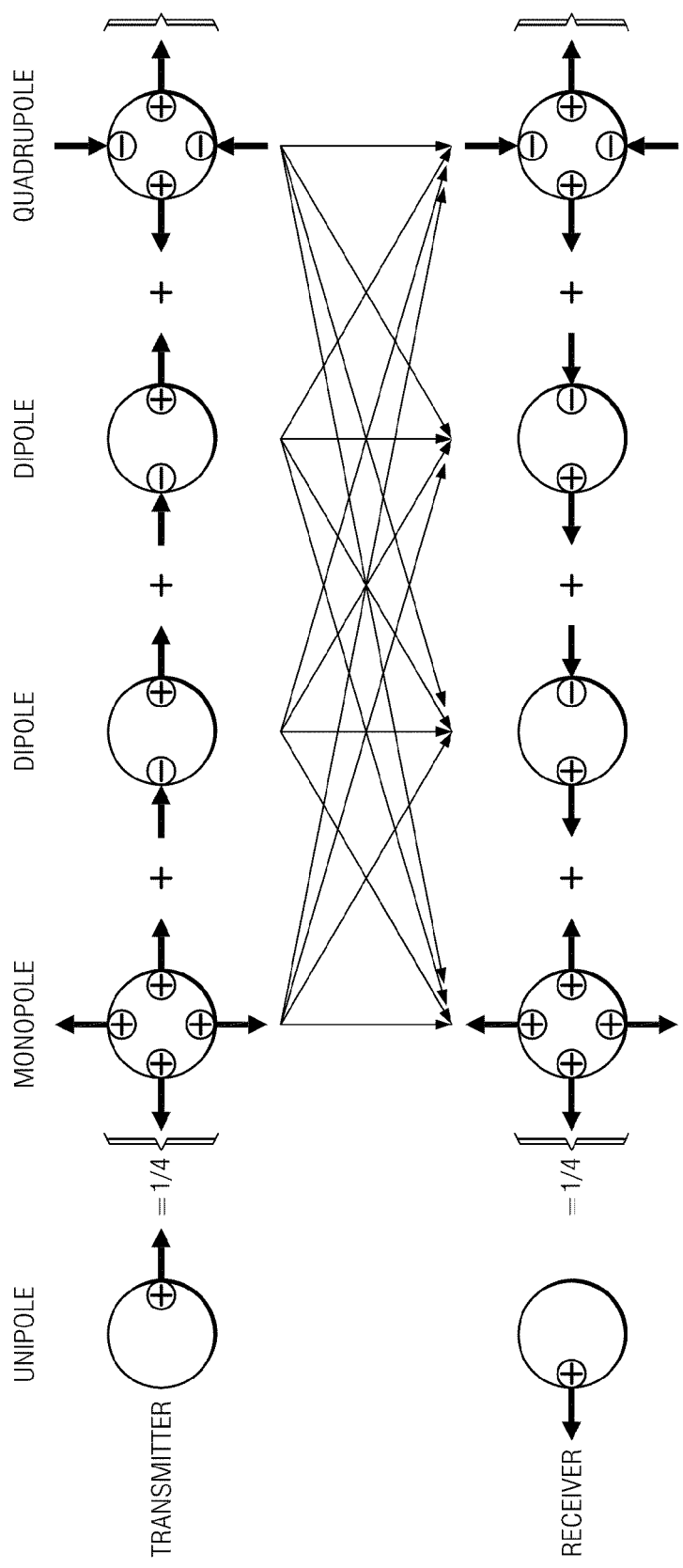
FIG. 7 depicts a unipole decomposition and its corresponding unipole response diagram for the exemplary unipole tool depicted on FIG. 6.

FIG. 7 depicts unipole decomposition, and the corresponding unipole response diagram, for the exemplary unipole tool embodiment 100 shown on FIG. 6. As described above, the transmitter 120 is deployed on the opposite side of the tool body 110 from the linear array 140. As in FIG. 4, the vertical and diagonal arrowed lines in FIG. 7 show the couplings 144 between the different mode transducers. The cross-unipole response for this particular embodiment may be expressed mathematically, for example, as follows:

$$Uu = (Mm - 2Md + Mq) + (2Dm + 4Dd + 2Dq) + \\ (Qm - 2Qd + Qq) \\ = Mm + 4Dd + Qq + (-2Md + 2Dm) + \\ (2Dq - 2Qd) + (Mq + Qm)$$

Equation 3

In Equation 3, the minus (−) signs for the dipole cross modes are used, consistent with the convention adopted in Equation 1, to indicate the direction associated with the dipole component of the transducers. By the reciprocity principle (i.e., Md=Dm, Dq=Qd, and Mq=Qm), Equation 3 can be reduced to the following:

$$Uu=Mm+4Dd+Qq+2Mq$$  Equation 4

Equation 4 is similar to Equation 2, but includes cross coupling between the monopole and quadrupole components. Since the monopole component has little dependence on the tool azimuth and the quadrupole component tends to have less dependence on the tool azimuth than the dipole component, Equation 4 indicates that a cross-unipole tool should have less azimuthal variation when the tool is eccentered in a borehole. As such, the cross-unipole tool advantageously should be less sensitive to being eccentered in the borehole.

Figure 8:
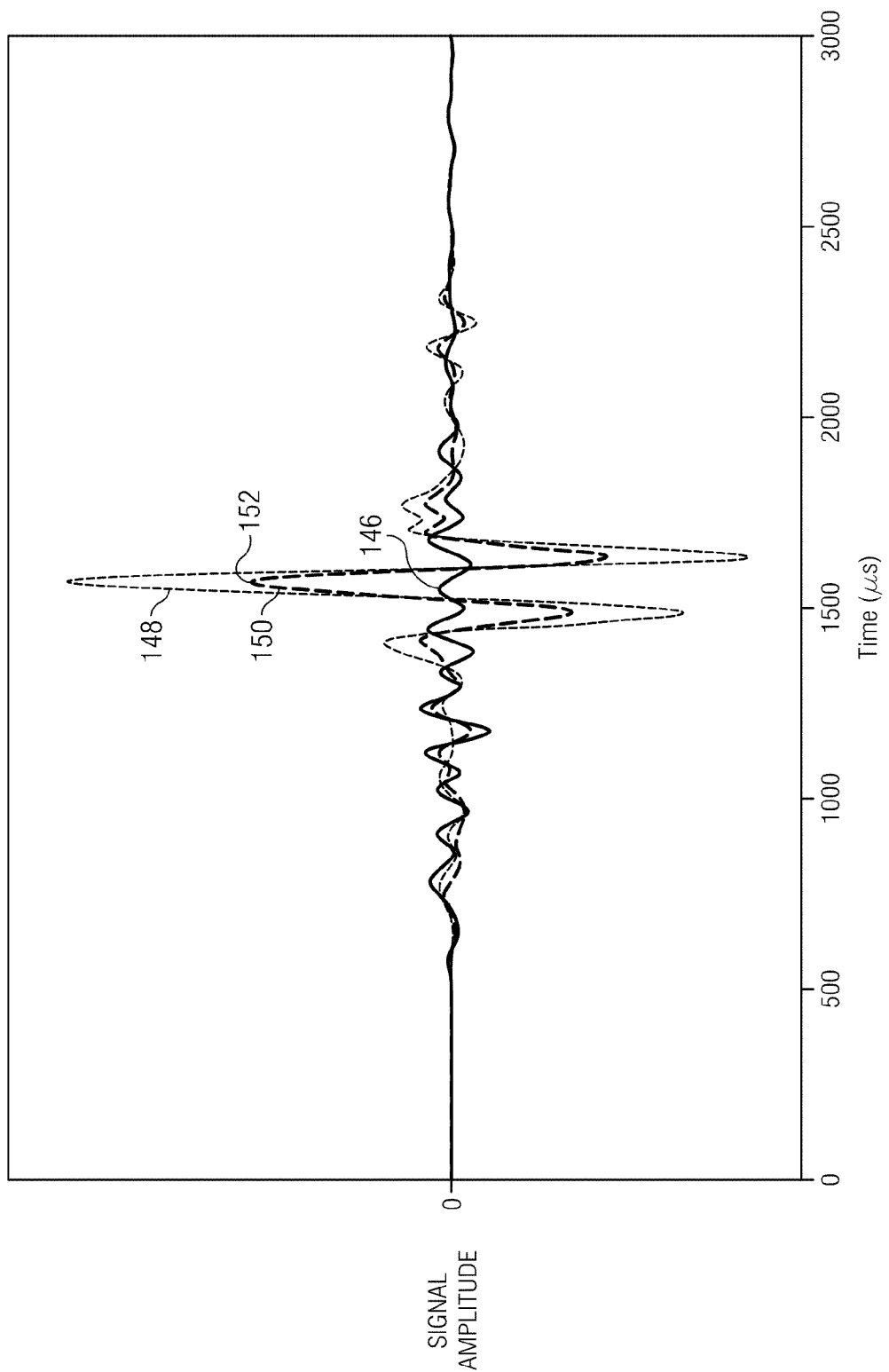
FIG. 8 depicts a plot comparing model waveforms for the inventive unipole tool depicted on FIG. 6 and the conventional unipole tool depicted on FIG. 2 for an eccentered tool.

To illustrate, FIG. 8 compares model waveforms obtained at a single receiver on the cross-unipole tool 100 with model waveforms obtained at the corresponding receiver on the conventional unipole tool 42 for eccentered tools in an isotropic formation. In this particular example, a 17 inch borehole is assumed so as to amplify the comparison. The tool is assumed to be eccentered with a 0.5 inch standoff from the nearer side. The waveforms obtained from the conventional unipole tool change as the eccentered tool rotates in the borehole. The received signal 146 is significantly less when the receiver faces away from borehole wall than the signal 148 obtained when the receiver faces towards the borehole wall. In contrast, the received signals 150 and 152 for the inventive cross-unipole tool 100 are substantially identical, indicating that the cross unipole tool 100 is much less sensitive to being eccentered. As a result, the sensitivity of the cross-unipole tool to formation anisotropies is far less complicated by inherent azimuthal variations in the tool response than for a conventional unipole tool when eccentered in the borehole. The cross-unipole tool may therefore advantageously be utilized for making sonic anisotropy measurements.

With reference again to FIG. 7, Equation 4 reduces to the following when the cross-unipole tool is centered in the borehole:

$$Uu=Mm+4Dd+Qq.$$  Equation 5

A comparison of Equation 5 with Equation 2 suggests that the cross-unipole tool response is substantially identical to that of the conventional unipole tool 42 when centered in a borehole. This conclusion has been further verified via numerical modeling.

Figure 9:
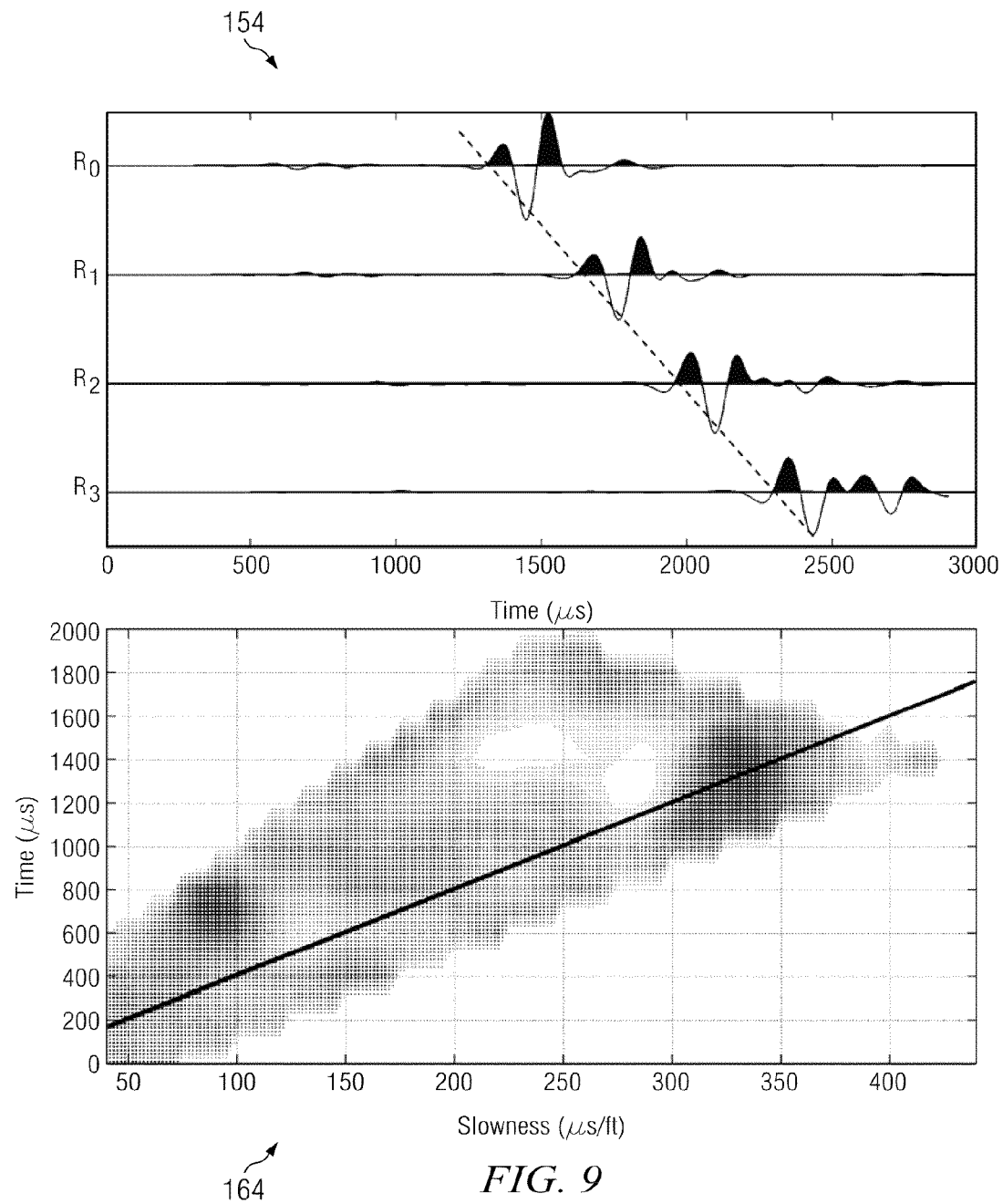
FIG. 9 depicts a semblance plot for a model tool similar to the cross-unipole tool depicted on FIG. 6.

The cross-unipole tool depicted on FIG. 6 is further advantageous in that it tends to reduce the required dispersion correction. This is now described in more detail with respect to FIG. 9, which depicts a theoretical coherence plot. In this example, a cross-unipole tool 100 having a seven inch diameter is deployed in a borehole having a 9.5 inch diameter. As with the example depicted on FIG. 3, the formation has a theoretical compressional slowness of 110 μs/ft and a theoretical shear slowness of 270 μs/ft. The drilling fluid has slowness of 203 us/ft. The upper plots 154 in FIG. 9 depict acoustic waveforms received at four consecutive receivers $R_0$, $R_1$, $R_2$, and $R_3$, which are spaced 12 inches apart. The waveforms received at the receivers $R_0$, $R_1$, $R_2$, and $R_3$ are processed to obtain the coherence plot depicted at 164. In this example, the shear slowness determined via semblance analysis is about 333 μs/ft, which is about 23% greater than the theoretical slowness. The required dispersion correction is surprisingly and advantageously less than the 30% required for the conventional unipole tool (FIGS. 2 and 3).

Figure 10:
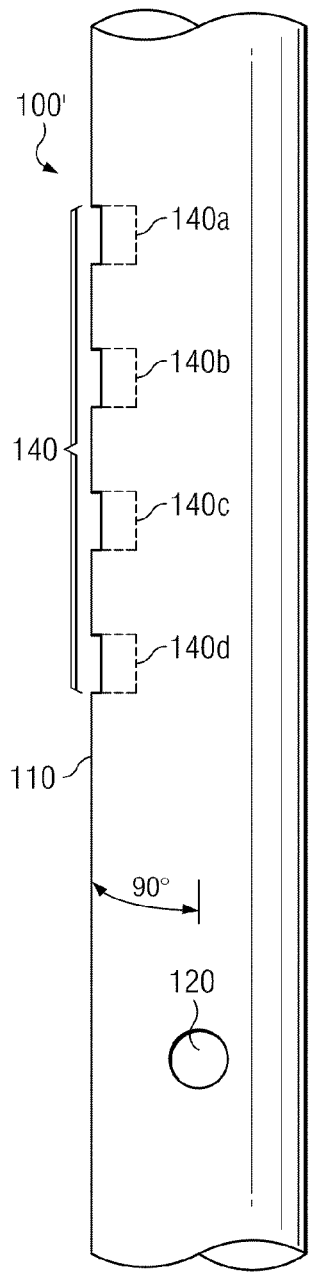
FIG. 10 depicts an alternative embodiment of a unipole acoustic logging tool in accordance with the present invention.
Figure 11:
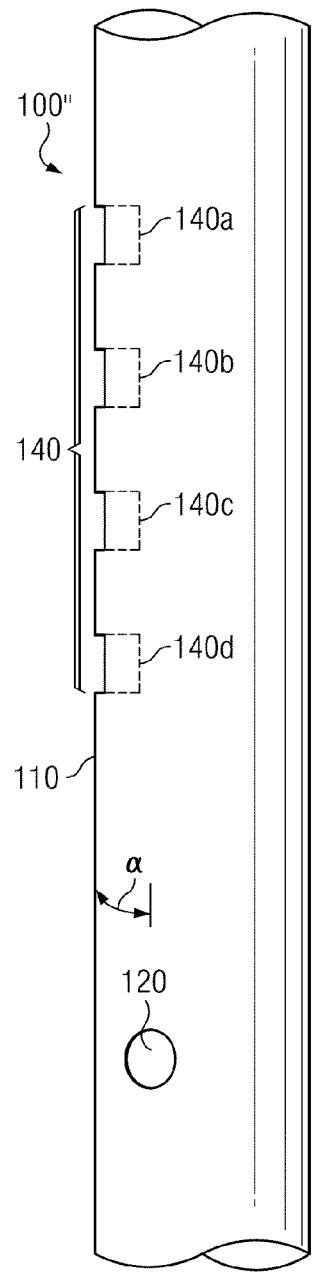
FIG. 11 depicts another alternative embodiment of a unipole acoustic logging tool in accordance with the present invention.

FIGS. 10 and 11 depict alternative LWD tool embodiments 100' and 100" in accordance with the present invention. LWD tools 100' and 100" are similar to LWD tool 100 (FIG. 6) in that each includes a single unipole transmitter 120 circumferentially and longitudinally spaced from a single linear array 140 of unipole acoustic receivers 140a-140d. In the exemplary embodiment 100' depicted on FIG. 10, the receiver array 140 is azimuthally spaced apart from the transmitter 120 by about 90 degrees. The tool response may be evaluated using a similar decomposition analysis as was used above for the cross-unipole tool 100 in Equations 3-5. This analysis indicates that the tool response will contain only monopole and quadrupole components when the tool 100' is centered in the borehole. The monopole component is known to excite a Stoneley wave and the quadrupole component is known to excite a screw wave. The screw wave has been previously shown to be essentially free of the tool mode at frequencies above its cutoff frequency. The Stoneley wave propagates along the fluid column between the tool body and the borehole wall. While the Stoneley wave is affected by the rigidity of the tool body, it tends not to propagate in the tool body as a tool mode. Hence the response of tool 100' (e.g., as shown on FIG. 10) is expected to be advantageously substantially insensitive to the tool mode (when the tool is centered in a borehole).

In the exemplary embodiment depicted on FIG. 11, the azimuthal spacing a between the transmitter 120 and the receiver array 140 is less than 90 degrees. As described above, with respect to FIG. 6, the azimuthal angle may be substantially any non-zero angle. In certain embodiments, the receiver array 140 is spaced apart from the transmitter 120 by at least 40 degrees. The response, in terms of mode transducer responses, for a unipole transmitter-receiver system having an arbitrary azimuthal displacement between the transmitter and the receiver array is more complicated than that for the embodiments discussed earlier, and generally is a weighted sum of main mode and cross mode responses where the weighting coefficients include trigonometric functions of the azimuthal displacement angle.

Figure 12:
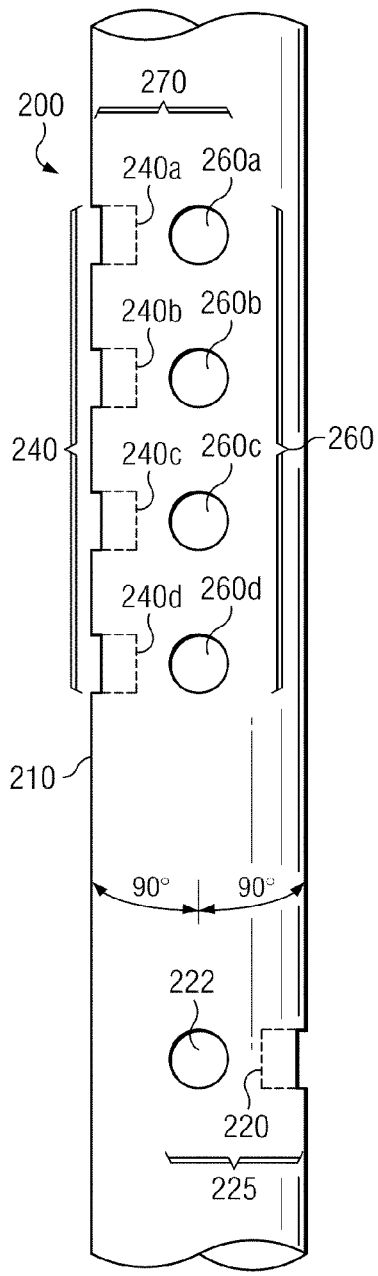
FIG. 12 depicts an exemplary embodiment of a bipole acoustic logging tool in accordance with the present invention.

Turning now to FIG. 12, another acoustic LWD tool embodiment 200 in accordance with the present invention is depicted. LWD tool 200 includes logging while drilling tool body 210 having exactly two unipole transmitters 220 and 222 deployed thereon. Transmitters 220 and 222 are longitudinally spaced apart from two linear arrays 240 and 260 of unipole acoustic receivers 240a-240d and 260a-260d, respectively. In the exemplary embodiment depicted, the two unipole transmitters 220 and 222 are azimuthally spaced apart from each other by about 90 degrees. These two unipole transmitters, in combination, are referred to herein as a bipole transmitter 225, and as such may be considered to be a single unit (i.e., a single bipole transmitter).

The two linear arrays of unipole receivers 240 and 260 are also azimuthally spaced apart from one another by about 90 degrees such that one of the unipole transmitters 222 is azimuthally (circumferentially) aligned with one of the linear arrays 260 of unipole receivers. These two linear arrays, in combination, are referred to herein as a bipole array of unipole receivers, and as such may be considered to be a single unit, i.e., a single bipole array) including a plurality of longitudinally spaced bipole receivers 270.

LWD tool 200 may also be referred to as a bipole acoustic LWD tool and may be thought of as being a combination of a conventional unipole tool 42 and the inventive cross-unipole tool 100 depicted on FIG. 6. In particular, the combination of transmitter 222 and linear array 260 may be thought of as a conventional unipole configuration, while the combination of transmitter 220 and linear array 240 may be thought of as a cross-unipole configuration.

Figure 13:
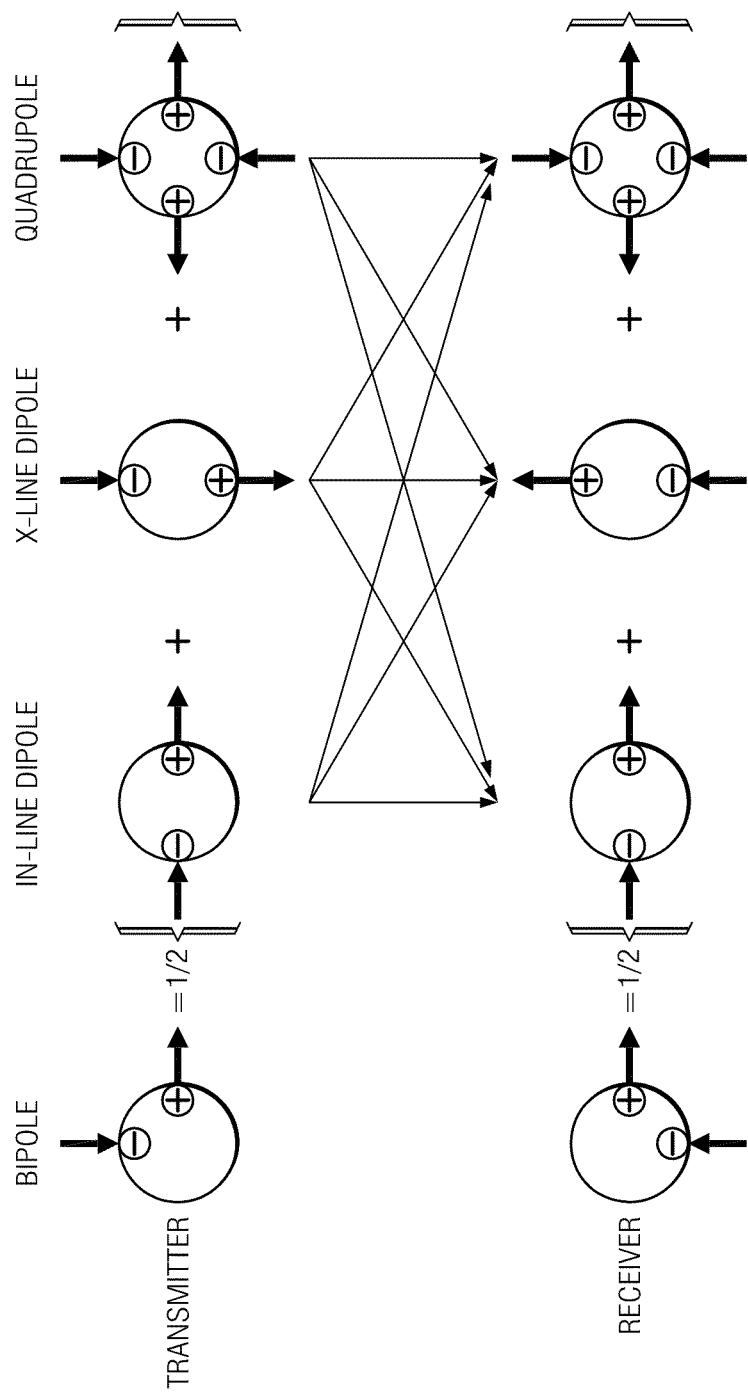
FIG. 13 depicts a decomposition and a corresponding response diagram for the bipole acoustic tool depicted on FIG. 12.

FIG. 13 shows a decomposition and the corresponding response diagram for LWD tool 200. As shown in FIG. 13, the two unipole transducers making up the bipole transmitter 225 have opposite polarities (i.e., they are configured to fire 180 degrees out of phase). As also shown, the bipole transmitter 225 may be considered to be a weighted combination of two crossed dipole transmitters and a quadrupole transmitter. The bipole receivers 270 may be similarly considered such that the bipole tool response may be expressed mathematically, for example, as follows:

$$\text{Bipole} = Qq + (D_\| d_\| - D_\perp d_\perp) + (-D_\| d_\perp + D_\perp d_\|) + (D_\| q + Q d_\|) + (D_\perp q - Q d_\perp) \quad \text{Equation 6}$$

where the subscripts $\|$ and $\perp$ designate the in-line dipole and the X-line dipole, respectively. In addition, due to convention on dipole direction, now applied to the X-line dipole in FIG. 13, contributions that include the receiver X-line dipole have an associated minus (−) sign. Owing to reciprocity (i.e., $D_\| d_\perp = D_\perp d_\|$ and $D_\perp = Q d_\perp$), Equation 6 may be simplified as follows:

$$\text{Bipole} = Qq + (D_\| d_\| - D_\perp d_\perp) + (D_\| q + Q d_\|) \quad \text{Equation 7}$$

Equation 7 may be further simplified when the tool is assumed to be centralized in the borehole (since $(D_\| d_\| - D_\perp d_\perp) = 0$ when the tool is centralized). Moreover, $D_\| d_\| - D_\perp d_\perp$ is typically small for an eccentered tool. Hence, the approximate bipole tool response is as follows:

$$\text{Bipole} \approx Qq + (D_\| q + Q d_\|) \quad \text{Equation 8}$$

Equation 8 indicates that the bipole tool response is composed primarily of a quadrupole response plus cross coupling between the dipole and quadrupole components. Equation 8 indicates that LWD tool 200 tends to be advantageously dominated by the quadrupole component and may therefore be considered to be a pseudo quadrupole tool. Moreover, LWD tool requires considerably fewer transmitting and receiving transducers than prior art quadrupole tools and is therefore expected to be less expensive and more reliable as compared to those prior tools.

Figure 14:
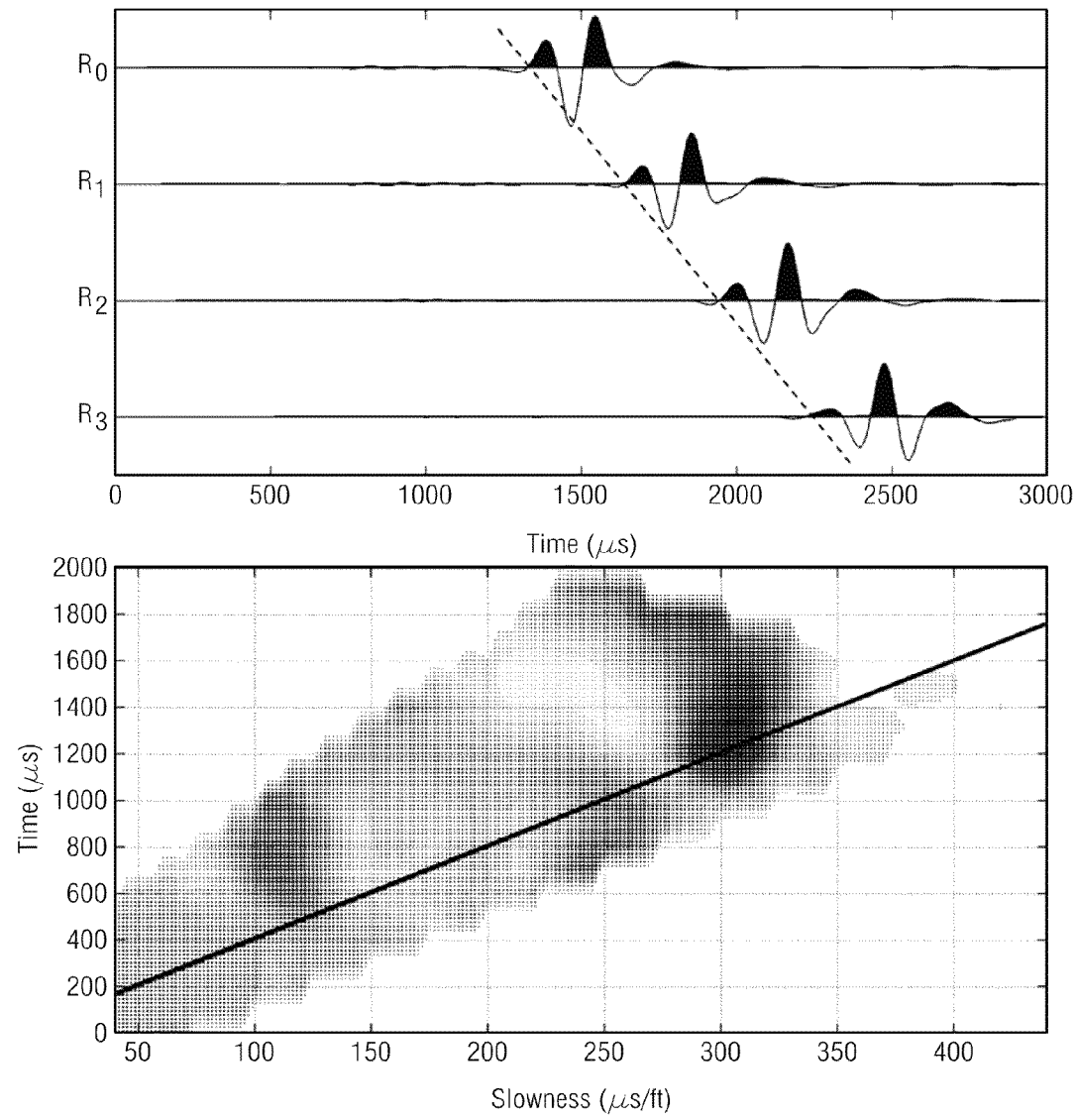
FIG. 14 depicts a semblance plot for a model tool similar to the bipole tool depicted on FIG. 12.

FIG. 14 shows synthetic waveforms received at receivers $R_0$, $R_1$, $R_2$, and $R_3$ corresponding to the receivers of the bipole receiver array 240 of bipole tool 200. A semblance plot 184 is also depicted. In the modeled data, the shear slowness determined via semblance analysis is about 305 μs/ft, which is about 13% greater than the theoretical shear slowness (270 μs/ft). This represents a significant and surprising improvement in the required dispersion correction as compared to the conventional unipole tool depicted on FIGS. 2 and 3 and the inventive cross-unipole depicted on FIGS. 6 and 9.

Figure 15:
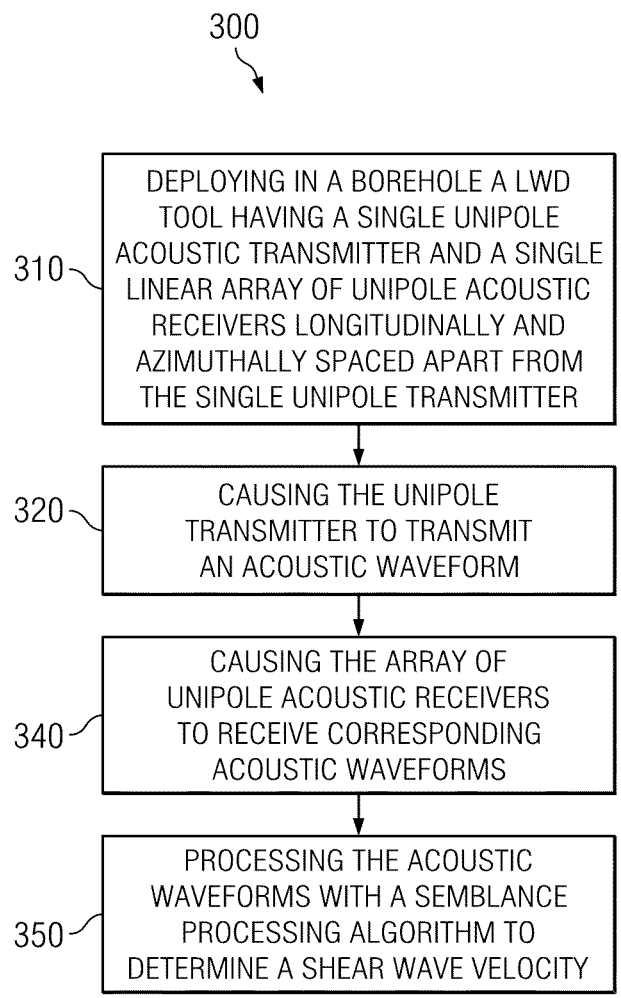
FIG. 15 depicts a flowchart of one exemplary method embodiment in accordance with the present invention.

FIG. 15 shows a flowchart of an exemplary method embodiment 300 in accordance with the present invention. Method 300 includes deploying 310 a logging while drilling tool, such as LWD tool 100, in a borehole. As described above, the tool includes (i) a logging while drilling tool body, (ii) a single unipole acoustic transmitter deployed on the tool body, and (iii) a single linear array of acoustic receivers deployed on the tool body. The single array includes a plurality of longitudinally spaced apart unipole acoustic receivers, with the acoustic receivers configured to receive the transmitted acoustic waveform, and with the acoustic receivers longitudinally and azimuthally spaced apart from the single unipole transmitter as also discussed above.

At 320 the unipole transmitter fires, thereby emitting an acoustic waveform. In various embodiments, step 320 may include exciting a borehole guided wave dominated by a dipole component. In other embodiments, step 320 may include exciting a borehole guided wave dominated by a quadrupole component. At 340 the waveform is received by the linear array of unipole receivers to receive corresponding acoustic waveforms. These waveforms are processed at 350 with a semblance processing algorithm to determine a shear slowness of the formation. The processing may further include determining a dispersion correction from estimated borehole and formation properties.

Although not shown in FIG. 6, 10, 11, or 12, it will be appreciated that downhole tools in accordance with this invention typically include an electronic controller. Such a controller typically includes conventional electrical drive voltage electronics (e.g., a high voltage power supply) for applying waveforms to the at least one transmitter to cause the transmitter to transmit an acoustic waveform. The controller typically also includes receiving electronics, such as a variable gain amplifier for amplifying the relatively weak return signal (as compared to the transmitted signal). That is, the controller is configured to cause the array of acoustic receivers to receive corresponding acoustic waveforms induced in the formation by the transmitted acoustic waveform. The receiving electronics may also include various filters (e.g., pass band filters), rectifiers, multiplexers, and other circuit components for processing the return signal. It will be appreciated that the controller may be disposed in the tool body, or may be located remotely from the tool body (e.g., elsewhere in the drill string). The invention is not limited in this regard.

A suitable controller typically further includes a digital programmable processor such as a microprocessor or a microcontroller and processor-readable or computer-readable programming code embodying logic, including instructions for controlling the function of the tool. Substantially any suitable digital processor (or processors) may be utilized, for example, including an ADSP-2191M microprocessor, available from Analog Devices, Inc.

The controller may be disposed, for example, to execute the method steps as described above with respect to FIG. 15. For example, the controller may be configured to make acoustic logging while drilling measurements, in which the measurements include causing a unipole or bipole transmitter to transmit an acoustic waveform, and causing an array of unipole or bipole receivers to receive corresponding acoustic waveforms. The controller may be still further configured to process received waveforms so as to obtain compressive and shear wave slownesses. The invention is not limited in any of these regards.

A suitable controller may also optionally include other controllable components, such as sensors, data storage devices, power supplies, timers, and the like. The controller may also be disposed to be in electronic communication with various sensors and/or probes for monitoring physical parameters of the borehole, such as a gamma ray sensor, a depth detection sensor, or an accelerometer, gyro or magnetometer to detect borehole azimuth and inclination as well as the tool face of the receivers. The controller may also optionally communicate with other instruments in the drill string, such as telemetry systems that communicate with the surface. The controller may further optionally include volatile or non-volatile memory or a data storage device.

Although the present invention and its advantages have been described in detail, it should be understood that various changes, substitutions and alterations can be made herein without departing from the spirit and scope of the invention as defined by the appended claims.

I claim:

1. An acoustic logging while drilling tool, comprising:
a logging while drilling tool body;
a single unipole acoustic transmitter deployed on the tool body, the transmitter configured to transmit an acoustic waveform having a first frequency into a subterranean borehole;
a second unipole acoustic transmitter configured to transmit an acoustic waveform having a second frequency, wherein the second frequency is not equal to the first frequency; and
a single linear array of unipole acoustic receivers deployed on the tool body, the linear array including a plurality of longitudinally spaced apart unipole acoustic receivers, the acoustic receivers configured to receive said transmitted acoustic waveform, the acoustic receivers being longitudinally and azimuthally spaced apart from the unipole acoustic transmitter.

2. The logging while drilling tool of claim 1, wherein the linear array comprises at least four unipole acoustic receivers.

3. The logging while drilling tool of claim 1, wherein the linear array is azimuthally spaced apart from the unipole acoustic transmitter by an angle of about 180 degrees.

4. The logging while drilling tool of claim 1, wherein the linear array is azimuthally spaced apart from the unipole acoustic transmitter by an angle of about 90 degrees.

5. The logging while drilling tool of claim 1, wherein the linear array is azimuthally spaced apart from the unipole acoustic transmitter by an angle of at least 40 degrees.

6. An acoustic logging while drilling tool, comprising:
a logging while drilling tool body;
a single unipole acoustic transmitter deployed on the tool body, the transmitter configured to transmit an acoustic waveform having a first frequency into a subterranean borehole; and
a single linear array of unipole acoustic receivers deployed on the tool body, the linear array including a plurality of longitudinally spaced apart unipole acoustic receivers, the acoustic receivers configured to receive said transmitted acoustic waveform, the acoustic receivers being longitudinally spaced apart from the unipole acoustic transmitter and azimuthally spaced apart from the unipole acoustic transmitter by an angle of about 180 degrees.

7. The logging while drilling tool of claim 6, further comprising a controller, the controller configured to make acoustic logging while drilling measurements, said measurements comprising (i) causing the unipole acoustic transmitter to transmit an acoustic waveform and (ii) causing the linear array of unipole acoustic receivers to receive corresponding acoustic waveforms.

8. The logging while drilling tool of claim 6, further comprising a second unipole acoustic transmitter configured to transmit an acoustic waveform having a second frequency, wherein the second frequency is not equal to the first frequency.

9. The logging while drilling tool of claim 8, wherein the second unipole acoustic transmitter is longitudinally spaced apart from the first unipole acoustic transmitter and deployed at the same azimuthal position as the first unipole acoustic transmitter.

10. The logging while drilling tool of claim 8, wherein the second unipole acoustic transmitter is azimuthally spaced apart from the first unipole acoustic transmitter and deployed at the same azimuthal position as the linear array of unipole acoustic receivers.

11. An acoustic logging while drilling tool, comprising:
a logging while drilling tool body;
a single unipole acoustic transmitter deployed on the tool body, the transmitter configured to transmit an acoustic waveform having a first frequency into a subterranean borehole; and
a single linear array of unipole acoustic receivers deployed on the tool body, the linear array including a plurality of longitudinally spaced apart unipole acoustic receivers, the acoustic receivers configured to receive said transmitted acoustic waveform, the acoustic receivers being longitudinally spaced apart from the unipole acoustic transmitter and azimuthally spaced apart from the unipole acoustic transmitter by an angle of about 90 degrees.

12. An acoustic logging while drilling tool, comprising:
a logging while drilling tool body;
two unipole acoustic transmitters deployed on the tool body, the unipole acoustic transmitters being azimuthally spaced apart from one another by about 90 degrees, each unipole acoustic transmitter configured to transmit an acoustic waveform into a subterranean borehole;
two linear arrays of unipole acoustic receivers deployed on the tool body, the linear arrays being azimuthally spaced apart from one another by an angle of about 90 degrees, the unipole acoustic receivers configured to receive said transmitted acoustic waveform, the linear arrays being further longitudinally and azimuthally spaced apart from at least one of the unipole acoustic transmitters; and
a controller configured to make acoustic logging while drilling measurements, said measurements comprising (i) causing each of the two unipole acoustic transmitters to transmit an acoustic waveform, and (ii) causing each of the linear arrays of unipole acoustic receivers to receive corresponding acoustic waveforms, wherein the controller is further configured in (i) to cause the two unipole acoustic transmitters to transmit corresponding waveforms having opposite polarities.

13. The logging while drilling tool of claim 12, wherein:
a first of the two unipole acoustic transmitters is deployed at the same azimuthal position as a first of the two linear arrays; and
a second of the two unipole acoustic transmitters is azimuthally spaced apart from a second of the two linear arrays by an angle of about 180 degrees.

14. The logging while drilling tool of claim 12, wherein:
a first of the two unipole acoustic transmitters is azimuthally spaced apart from a first of the two linear arrays by an angle of about 90 degrees; and
a second of the two unipole acoustic transmitters is azimuthally spaced apart from a second of the two linear arrays by an angle of about 90 degrees.

15. The logging while drilling tool of claim 12, wherein the controller is further configured (iii) to process the waveforms received in (ii) by a first of the two linear arrays of unipole acoustic receivers with a first polarity and the waveforms received in (ii) by a second of the two linear arrays of unipole acoustic receivers with a second polarity, the second polarity being opposite to the first polarity.

16. An acoustic logging while drilling tool, comprising:
a logging while drilling tool body;
a single bipole transmitter consisting of first and second unipole transmitters deployed at the same longitudinal position on the tool body, the first and second unipole transmitters being azimuthally spaced apart by an angle of about 90 degrees;
a single bipole array of unipole receivers consisting of first and second linear arrays of unipole receivers deployed at the same longitudinal position on the tool body, the first and second linear arrays being azimuthally spaced apart by an angle of about 90 degrees, the bipole array of unipole receivers being azimuthally spaced apart from the bipole transmitter by an angle of about 90 degrees; and
a controller configured to make acoustic logging while drilling measurements, said measurements comprising (i) causing the bipole acoustic transmitter to transmit an acoustic waveform, and (ii) causing the array of bipole acoustic receivers to receive corresponding acoustic waveforms.

17. The logging while drilling tool of claim 16, wherein the controller is further configured in (i) to cause the two unipole acoustic transmitters to transmit corresponding waveforms having opposite polarities.

18. The logging while drilling tool of claim 16, wherein the controller is further configured (iii) to process the waveforms received in (ii) by a first of the two linear arrays of unipole acoustic receivers with a first polarity and the waveforms received in (ii) by a second of the two linear arrays of unipole acoustic receivers with a second polarity, the second polarity being opposite to the first polarity.

* * * * *